(12) United States Patent
Jakobi et al.

(10) Patent No.: US 6,503,618 B1
(45) Date of Patent: Jan. 7, 2003

US006503618B1

(54) TRANSVERSELY TEARABLE DOUBLE-SIDED NOTCHED ADHESIVE TAPE

(75) Inventors: Wolfgang Jakobi, Neuried; Benno Besler, Offenburg; Werner Kluge-Paletta, Buchholz; Susann Friedrich, Offenburg; Peter Jauchen, Hamburg; Bodo Szonn, Kisdorf, all of (DE)

(73) Assignee: tesa AG, Hamburg (DE)

( * ) Notice: Subject to any disclaimer, the term of this patent is extended or adjusted under 35 U.S.C. 154(b) by 722 days.

(21) Appl. No.: 08/839,617

(22) Filed: Apr. 15, 1997

Related U.S. Application Data

(62) Division of application No. 08/727,328, filed on Oct. 8, 1996, which is a continuation of application No. 08/252,869, filed on Jun. 2, 1994, now abandoned.

(30) Foreign Application Priority Data

Jun. 3, 1993 (DE) ........................................... 43 18 277

(51) Int. Cl.⁷ ................................. C09J 7/02; B32B 7/12
(52) U.S. Cl. ...................... 428/343; 428/41.8; 428/192; 428/354; 428/906
(58) Field of Search ................................. 428/192, 343, 428/41.8, 354, 906

(56) References Cited

U.S. PATENT DOCUMENTS

| | | | |
|---|---|---|---|
| 2,400,527 A | 5/1946 | Aycock | |
| 2,508,855 A | 5/1950 | Brown | |
| 3,887,745 A | * 6/1975 | Yoskii | |
| 4,155,282 A | 5/1979 | Anderson | |
| 4,439,482 A | 3/1984 | Suematsu | |
| 4,543,279 A | * 9/1985 | Kai | |
| 4,581,087 A | * 4/1986 | Johnson | |
| 4,851,064 A | 7/1989 | Darbo | |
| 5,366,775 A | * 11/1994 | Kao | ........................... 428/41.5 |
| 5,795,834 A | * 8/1998 | Deeb | |

FOREIGN PATENT DOCUMENTS

| | | |
|---|---|---|
| CH | 500 275 | 1/1971 |
| DE | 1 008 846 | 5/1957 |
| DE | 2 016 544 | 12/1970 |
| DE | 2 363 657 | 6/1974 |
| DE | 2 440 286 | 3/1975 |
| DE | 2 034 800 | 4/1975 |
| DE | 2 116 989 | 2/1978 |
| DE | 3 323 018 | 1/1985 |
| FR | 1 514 712 | 2/1968 |
| GB | 856 192 | 12/1960 |
| GB | 1 188 344 | 4/1970 |
| GB | 2 191 969 | 12/1987 |
| JP | 559 334 | 3/1993 |

OTHER PUBLICATIONS

Mead Packaging, Tamper Resistant Packaging From 3M, Jul. 12, 1994.

* cited by examiner

*Primary Examiner*—Daniel Zirker
(74) *Attorney, Agent, or Firm*—Norris McLaughlin & Marcus

(57) ABSTRACT

A double-sided adhesive tape having a continuous series of toothed notches of about 0.3 mm to 6 mm jag height which easily transversely tearable by hand.

19 Claims, 2 Drawing Sheets

TRANSVERSELY TEARABLE DOUBLE-SIDED NOTCHED ADHESIVE TAPE

This is a divisional of application Ser. No. 08/727,328, filed on Oct. 8, 1996 now pending, which is a FWC of application Ser. No. 08/252,869, filed on Jun. 2, 1994, now abandoned.

BACKGROUND OF THE INVENTION

1. Field of the Invention

The invention relates to the use of jagged cutters for the longitudinal cutting of double-face self-adhesive tapes with polypropylene (PP) backing for the purpose of edge tearability, i.e. rendering the tapes hand-tearable transversely.

The problem of edge tearability in the case of self-adhesive tapes has been present for a long time. Since adhesive tapes with plastic film backings are usually difficult to tear off by hand, use has to be made of a knife or scissors, or else the teeth if necessary.

2. Description of the Prior Art

Because of this requirement, which is so important in practice, this problem has been approached from various angles. For example, special backing films were developed, for example foamed and/or stretched, which were intended to have paper-like properties as regards their edge tearability, e.g. DE-A 3 323 018. For the high requirements in practice, however, such adhesive tapes have been found inadequate and have not been able to become established. This also includes products with a reinforcing fabric on backing film, developed especially for edge tearability, such as are described in U.S. Pat. No. 4,439,482.

It has also been proposed in the past to perforate the film backing of such an adhesive tape, e.g. U.S. Pat. No. 4,581,087, for example by means of embossing rolls, to obtain edge tearability by hand. Adhesive tapes with PP backings were also intended to have this ability by utilizing specific stretching ratios and contents of isotactic PP, e.g. DEA-A 2 440 286, but this too was not able to become established in practice.

Finally, the edges of self-adhesive tapes were already worked, for example, with cutters from which parts in the cutting region had been broken out (knurled), in order thereby to effect a non-uniform cut. However, in the case of difficult-to-tear adhesive tapes with tough and resilient PP backings, in which an adhesive composition also has to be additionally cut through, such a cutting process also fails.

OBJECT OF THE INVENTION

Therefore the object of the invention is to provide a remedy therefor, in particular to configure double-face self-adhesive tapes with PP backing to meet the high requirements of edge tearability, so that such adhesive tapes can be torn off transversely by hand without need for scissors or knives. This must not make the restrippability of the adhered tapes more difficult by, for example, undesired tearing occurring in the process.

SUMMARY OF THE INVENTION

This object is achieved according to the invention by the use of jagged cutters for the longitudinal cutting of such adhesive tapes.

Jagged cutters are known per se, being used, for example, in the production of plasters and similar medical products, to prevent fraying of fabric backings or wherever a product with a jagged edge is required for optical reasons. Such jagged cutters are therefore commercially available. Jagged cutters are also conventional, for example, integrated in unwinders, for the transverse cutting of adhesive tapes.

However, in view of the decades long existence of the problem, problem-free edge tearability in the case of double-face PP adhesive tapes, it is surprising to those skilled in the art of adhesive tape that it could be solved so easily. Even in the case of fixing products covered with release paper, the invention results in a smooth tear edge across the entire product, both in the PP backing and in the release paper, without significant force being necessary for tearing off.

It has further been found that the loss of edge adhesiveness of the rolls cut according to the invention is significantly reduced, as a result of the reduced contact area of the rolls with one another in a roll stack. By this means, the interleave discs otherwise necessary are superfluous.

The jagged cutters used preferably have jag height of approximately 0.3–6 mm, in particular 0.3–2.0 mm. preferably 0.4–1.0 mm, very particularly 0.5 mm. In this arrangement, the peak angle of a jag is preferably chosen such that the tearing force of the finished roll lies within the desired range. The more obtuse the angle, the more difficult the edge tearability becomes, reaching the value of the smoothly cut material at 180°. A peak angle of 60 to 120°, especially 90°, has proven particularly favorable. The crushing bar is 0.03 to 0.15 mm wide, preferably 0.05 mm wide.

In the case of a particularly suitable PP fixing tape covered with release paper and wound into a roll, the jagged cutter advantageously applied to the already covered fixing tape, both the adhesive tape and the release paper having the same jagged cut laterally, with easy and smooth tearability by hand.

The invention is further described in the following illustrative non-limiting example.

EXAMPLE

A jumbo roll of 1,000 m length and 1,050 mm width, mounted on a 50 μm biaxially stretched PP backing, coated on both sides with 100 g/m² of rubber self-adhesive composition and covered on one side with a silicone-treated release paper, is cut up into saleable rolls. The longitudinal cuts are made by means of crush cutters against a steel roll. The crush cutters are specially ground to obtain a jagged cut. Cutters of this kind are available from Alcon Tools, Ohio, USA. The jag height of the cutters is 0.5 mm, the peak angle of a jag is 90°. The further cutting parameters are unchanged with respect to the standard process: cutting rate 100 m/min., winding tension remains uniform without, in the process, additional machine stops occurring as a result of unintended tears.

With the use of this macroscopic jagged cutter, edge tearability is achieved even though the PP film is cut through the adhesive composition and release paper against a steel cylinder.

The carpet fixing tape thus obtained can be torn off transversely, smoothly by hand without problems and with low force.

The invention is further illustrated by the accompanying drawings, wherein.

DETAILED DESCRIPTION OF THE DRAWINGS

Figure 2:
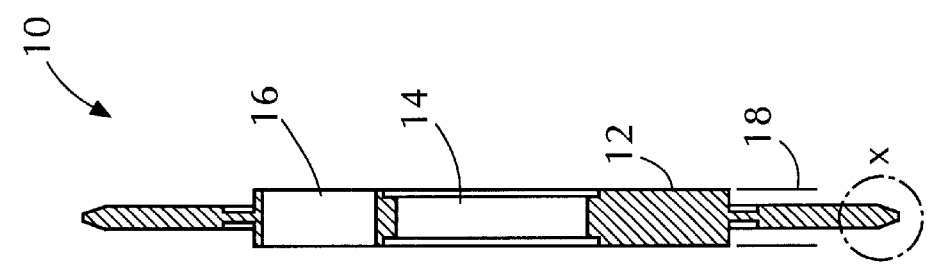
FIG. 2 is a section along line Y of FIG. 1.
Figure 1:
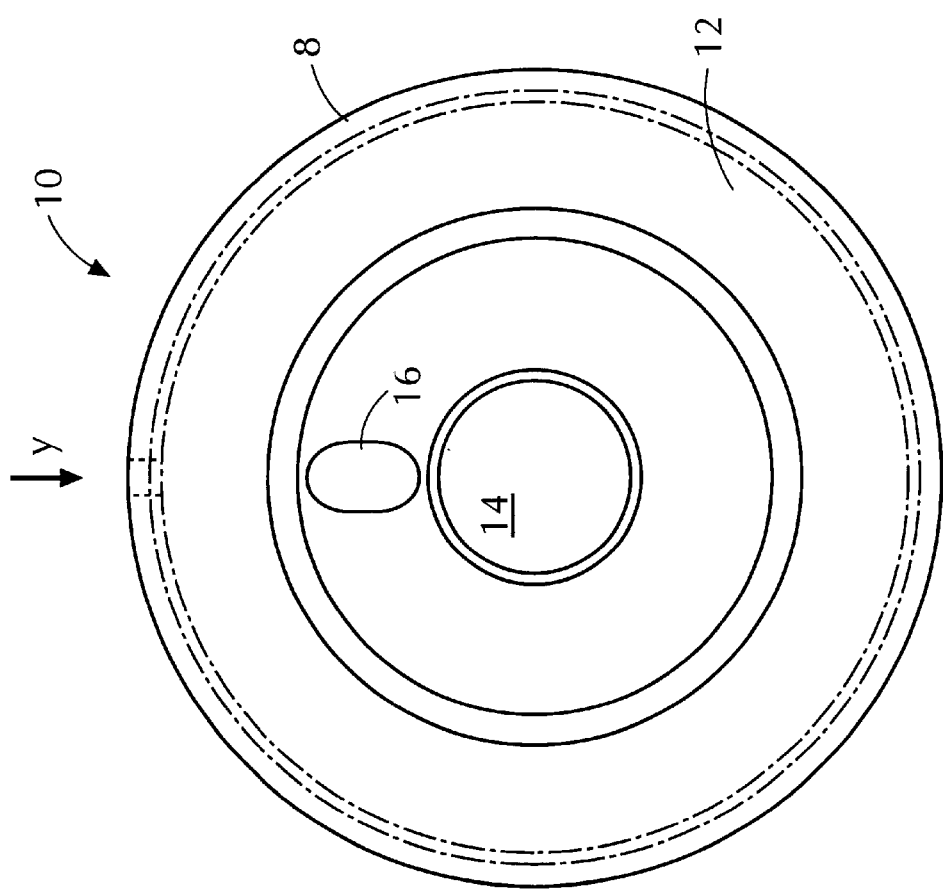
FIG. 1 is a plan view of a disc knife usable in accordance with the invention.

Referring now more particularly to the drawing, the disk knife 10 comprises an annular body 12 about a central opening 14. The body 12 is also provided with an opening 16 which assists in the lateral alignment and driving of a multiplicity of disks as in FIG. 2 (not shown).

Figure 4:
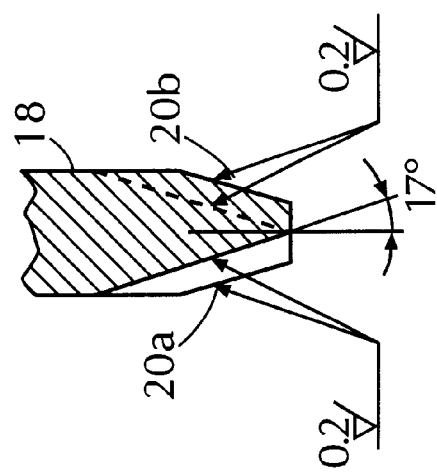
FIG. 4 is an enlarged view of the section of the knife encircled in FIG. 2.
Figure 3:
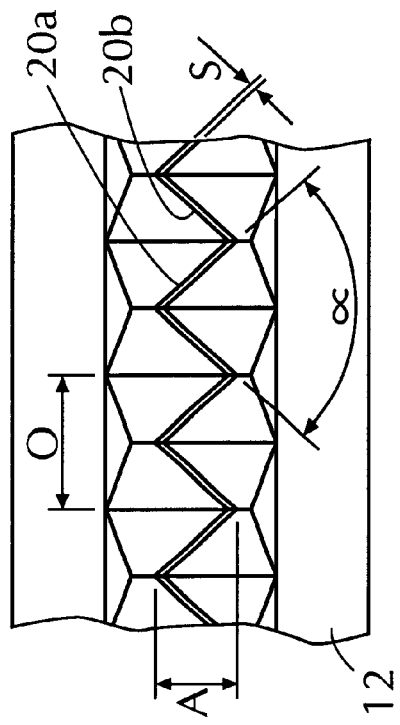
FIG. 3 is an enlarged view of a portion of the cutting edge of the knife of FIG. 1.

A narrower annular portion 18 surrounds and is integral with body 12. The remotest cutting portion of portion 18 is shown on an enlarged scale in FIGS. 3 and 4. It is not simply flat-sided but rather is zig-zag scalloped or jagged both laterally and longitudinally. Thus, adjacent portions 20*a* and 20*b* are slightly offset, i.e. vertically in FIG. 3 or laterally in FIG. 4. In addition, however, they are angled relative to one another.

In carrying out the process, a wide tape band is mounted on an unwind shaft from which it is wound onto a wind-up shaft. Between the unwind and the wind-up shafts the band passes over part of the surface of a cutting back-up roll. A cutter shaft carrying a plurality of cutters as shown in FIGS. 1 to 4 is urged against the moving band, the cutters cutting the band into a plurality of bands which are taken up on the wind-up shaft as a plurality of narrow tapes, all in conventional manner. However, because of the cutter configuration the sides of the narrow tapes are not absolutely linear, being defined by the cutting edge configuration of the cutters. The resulting tapes can thereafter be torn transversely by hand.

It is understood that the specification and examples are illustrative but not limitative of the present invention and that other embodiments within the spirit and scope of the invention will suggest themselves to those skilled in the art.

What is claimed is:

1. A double sided adhesive tape for securing sections of carpet, which tape is easily transversely tearable comprising:
    a) a biaxially-stretched polypropylene backing having an upper and lower surface, and two longitudinal side edges,
    b) an adhesive layer on said upper and lower surfaces, and
    c) a release paper on at least one of the adhesive-coated surfaces, and
    d) a continuous series of toothed notches having about 0.3 to 6 mm jag heights in at least one side edge whereby the tape can be torn transversely by hand.

2. A transversely tearable adhesive tape according to claim 1, wherein the jag height ranges from about 0.4 to about 1 mm.

3. A transversely tearable adhesive tape according to claim 1, wherein the jag height ranges from about 0.5 to about 1 mm.

4. A transversely tearable adhesive tape according to claim 1, wherein the polypropylene backing is 50 μm in thickness.

5. A transversely tearable adhesive tape according to claim 1, wherein the adhesive layer on each surface is in an amount of 100 g/m² of rubber self-adhesive composition.

6. A transversely tearable adhesive tape according to claim 1, wherein the release paper is a silicone-treated release paper.

7. A transversely tearable adhesive tape according to claim 1, wherein the peak angle of the notch ranges from 60° to 120°.

8. A transversely tearable adhesive tape according to claim 1, wherein the peak angle of the notch is 90°.

9. A process for laying carpet comprising securing sections of carpet to a surface using the tape of claim 1.

10. A process for laying carpet according to claim 1, wherein the tape is transversely torn by hand to obtain a length of tape necessary for securing a section of carpet.

11. A roll of double sided adhesive tape for securing sections of carpet, which tape is easily transversely tearable comprising:
    a) a biaxially-stretched polypropylene backing having an upper and lower surface and two longitudinal side edges.
    b) an adhesive layer on said upper and lower surfaces, and
    c) a release paper on at least one of the adhesive-coated surfaces, and
    d) a continuous series of toothed notches having jag heights of from 0.3 to 6 mm cut into at least one side edge thereof, the tape when rolled providing a jagged edge to the roll to diminish substantial inter-adhesion between adjacent rolls of tape and the tape when unwound being transversely tearable by hand.

12. A roll of transversely tearable adhesive tape according to claim 11, wherein the jag height of the notches ranges from about 0.4 to about 1 mm.

13. A roll of transversely tearable adhesive tape according to claim 11, wherein the jag height of the notches ranges from about 0.5 to about 1 mm.

14. A roll of transversely tearable adhesive tape according to claim 11, wherein the polypropylene backing is 50 μm in thickness.

15. A roll of transversely tearable adhesive tape according to claim 11, wherein the adhesive layer on each surface is in an amount of 100 g/m² of rubber self-adhesive composition.

16. A roll of transversely tearable adhesive tape according to claim 11, wherein the release paper is silicone treated release paper.

17. A roll of transversely tearable adhesive tape according to claim 11, wherein the peak angle of the notch ranges from 60° to 120°.

18. A roll of transversely tearable adhesive tape according to claim 11, wherein the peak angle of the notch is 90°.

19. A process of laying carpet comprising unrolling a section of tape from the roll of tape according to claim 11, wherein the tape has a release paper on one adhesive surface, securing the adhesive not covered by release paper to the surface to be carpeted, transversely tearing the tape by hand to provide a tape of the desired length, removing the release paper to reveal the other adhesive layer and securing a section of carpet to the thus exposed adhesive.

* * * * *